(12) United States Patent
Du et al.

(10) Patent No.: US 12,498,519 B2
(45) Date of Patent: Dec. 16, 2025

(54) REAR-VIEW DEVICE

(71) Applicants: Beijing BOE Technology Development Co., Ltd., Beijing (CN); BOE Technology Group Co., Ltd., Beijing (CN)

(72) Inventors: Zhihong Du, Beijing (CN); Wenbo Li, Beijing (CN); Jindou Liu, Beijing (CN); Yuqiang Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 498 days.

(21) Appl. No.: 17/923,569

(22) PCT Filed: Dec. 30, 2021

(86) PCT No.: PCT/CN2021/143001
§ 371 (c)(1),
(2) Date: Nov. 4, 2022

(87) PCT Pub. No.: WO2023/123193
PCT Pub. Date: Jul. 6, 2023

(65) Prior Publication Data
US 2025/0076571 A1    Mar. 6, 2025

(51) Int. Cl.
G02B 6/06    (2006.01)
A42B 3/04    (2006.01)

(52) U.S. Cl.
CPC .............. G02B 6/06 (2013.01); A42B 3/0406 (2013.01)

(58) Field of Classification Search
None
See application file for complete search history.

(56) References Cited

U.S. PATENT DOCUMENTS

| 4,398,811 | A | * | 8/1983 | Nishioka | ............ | G02B 23/2407 |
| | | | | | | 385/117 |
| 4,403,837 | A | * | 9/1983 | Nakahashi | ............... | G02B 9/60 |
| | | | | | | 359/740 |
| 4,439,157 | A | | 3/1984 | Breglia et al. | | |
| 4,465,347 | A | | 8/1984 | Task et al. | | |

(Continued)

FOREIGN PATENT DOCUMENTS

CN    2442281 Y    8/2001
CN    2500131 Y    7/2002
(Continued)

Primary Examiner — Jerry Rahll
(74) Attorney, Agent, or Firm — IPro, PLLC

(57) ABSTRACT

The present disclosure provides a rear-view device, including a helmet and a rear-view image guiding system arranged on the helmet. The rear-view image guiding system includes a light conduction optical fiber bundle, and an objective lens group and an eyepiece lens group arranged at two ends of the light conduction optical fiber bundle respectively; the helmet includes a first cladding region and a second cladding region; the objective lens group is arranged in the second cladding region, and configured to convert received incident light into parallel light; the light conduction optical fiber bundle is configured to transmit the parallel light to the eyepiece lens group; and the eyepiece lens group is configured to converge the parallel light and transmit convergent light to an eye region of the helmet.

12 Claims, 4 Drawing Sheets

(56) References Cited

U.S. PATENT DOCUMENTS

| | | | | |
|---|---|---|---|---|
| 4,615,333 A | * | 10/1986 | Taguchi | A61B 1/00165 385/117 |
| 4,805,598 A | * | 2/1989 | Ueda | A61B 1/00165 600/176 |
| 5,059,004 A | * | 10/1991 | Matsumura | G02B 25/001 359/646 |
| 5,515,208 A | * | 5/1996 | Yamamoto | G02B 23/243 359/740 |
| 5,777,797 A | * | 7/1998 | Miyano | G02B 9/34 600/176 |
| 5,790,313 A | * | 8/1998 | Kanai | G02B 25/001 359/645 |
| 10,215,978 B2 | * | 2/2019 | Cao | G02B 13/002 |
| 2003/0178558 A1 | * | 9/2003 | Fukuyama | G02B 21/02 250/234 |
| 2006/0007558 A1 | * | 1/2006 | Hirata | G02B 21/33 359/656 |
| 2010/0245653 A1 | * | 9/2010 | Bodor | G02B 23/243 348/335 |
| 2018/0325202 A1 | | 11/2018 | Mcallister et al. | |
| 2022/0397746 A1 | * | 12/2022 | Chen | G02B 13/16 |

FOREIGN PATENT DOCUMENTS

| | | |
|---|---|---|
| CN | 2827047 Y | 10/2006 |
| CN | 201139056 Y | 10/2008 |
| CN | 110621182 A | 12/2019 |
| CN | 111538150 A | 8/2020 |
| EP | 0007432 A1 * | 6/1980 |
| JP | S6254210 A | 3/1987 |

* cited by examiner

REAR-VIEW DEVICE

CROSS-REFERENCE TO RELATED APPLICATION

This application is the U.S. national phase of PCT Application No. PCT/CN2021/143001 filed on Dec. 30, 2021, the entire contents of which are hereby incorporated by reference.

TECHNICAL FIELD

The present disclosure relates to the field of a wearable device, in particular to a rear-view device.

BACKGROUND

Cycling has become a popular travelling way because it is convenient and beneficial to health. However, due to large quantity of vehicles and pedestrians on a road as well as complex road conditions, there will be great potential safety hazards when cycling. More than 40% of traffic accidents on the road are related to bicycles, and bicycles are in a weak position in traffic, which is easy to cause accidents or injuries. For example, during the cycling, due to a limitation on a field of view, it is necessary for a driver to turn around frequently to observe the road conditions, which is very inconvenient and causes safety risks.

SUMMARY

An object of the present disclosure is to provide a rear-view device, so as to prevent the safety risk due to a limitation on a field of view during the cycling.

The present disclosure provides in some embodiments a rear-view device, including a helmet and a rear-view image guiding system arranged on the helmet. The rear-view image guiding system includes a light conduction optical fiber bundle, and an objective lens group and an eyepiece lens group arranged at two ends of the light conduction optical fiber bundle respectively; the helmet includes a first cladding region and a second cladding region, the first cladding region is a region of the helmet corresponding to a front face region of a wearer, and the second cladding region is a region of the helmet except the first cladding region; the objective lens group is arranged in the second cladding region, light transmitted to at least a part of the second cladding region reaches the objective lens group, and the objective lens group is configured to convert received incident light into parallel light; the light conduction optical fiber bundle is configured to transmit the parallel light to the eyepiece lens group; and the eyepiece lens group is configured to converge the parallel light and transmit convergent light to an eye region of the helmet.

In a possible embodiment of the present disclosure, the objective lens group includes a first convex lens, a second convex lens and a first concave lens arranged in a transmission direction of the incident light in sequence. A light-entering surface and a light-exiting surface of the first convex lens are curved surfaces protruding towards a direction opposite to the transmission direction of the incident light; and a light-entering surface of the first concave lens is a curved surface depressed towards the transmission direction of the incident light, and a light-exiting surface of the first concave lens is a plane.

In a possible embodiment of the present disclosure, the second convex lens includes a first convex sub-lens and a second convex sub-lens arranged in the transmission direction of the incident light in sequence, the first convex sub-lens and the second convex sub-lens are spaced apart from each other, and a light-exiting surface of the second convex sub-lens is attached to the light-entering surface of the first concave lens.

In a possible embodiment of the present disclosure, a refractive index of the first convex sub-lens is the same as a refractive index of the second convex sub-lens.

In a possible embodiment of the present disclosure, the eyepiece lens group includes a second concave lens, a third convex lens and at least one reflector arranged in a transmission direction of the parallel light in sequence, a light-entering surface of the second concave lens is a plane, a light-exiting surface of the third convex lens is a curved surface protruding towards the transmission direction of the parallel light, and convergent light exiting from the third convex lens is reflected by the reflector and then transmitted to the eye region of the helmet.

In a possible embodiment of the present disclosure, the third convex lens includes a third convex sub-lens and a fourth convex sub-lens arranged in the transmission direction of the parallel light in sequence, the third convex sub-lens and the fourth convex sub-lens are spaced apart from each other, and a light-entering surface of the third convex sub-lens is attached to the second concave lens; and a refractive index of the fourth convex sub-lens is greater than a refractive index of the third convex sub-lens.

In a possible embodiment of the present disclosure, the rear-view device further includes an angle adjustment structure coupled to the helmet and the reflector and configured to adjust an angle of the reflector relative to the eye region.

In a possible embodiment of the present disclosure, the quantity of the reflectors is an odd number, the light conduction optical fiber bundle includes a first portion and a second portion in a length direction, the first portion is coupled to the second portion through a rotatable bending portion, and the second portion is turned by a predetermined angle relative to the first portion through the rotatable bending portion.

In a possible embodiment of the present disclosure, the angle adjustment structure includes: a first support structure fixedly coupled to the helmet and including an accommodation space, an inner bottom surface of the accommodation space being a first spherical surface; and a second support structure, the reflector being fixed on the second support structure, the second support structure including a second spherical surface and being arranged in the accommodation space, the second spherical surface being attached to the first spherical surface, and the angle of the reflector relative to the eye region being changed through the movement of the second spherical surface relative to the first spherical surface.

In a possible embodiment of the present disclosure, the parallel light is transmitted in the light conduction optical fiber bundle in a total reflection manner.

In a possible embodiment of the present disclosure, the light conduction optical fiber bundle includes a plurality of optical fibers, each optical fiber includes a core layer and a cladding layer surrounding the core layer, and a refractive index of the core layer is greater than a refractive index of the cladding layer.

In a possible embodiment of the present disclosure, a flexible protection layer surrounds the light conduction optical fiber bundle, two ends of the flexible protection layer are coupled to fixed ends respectively, and the two ends of the light conduction optical fiber bundle are fixed inside the fixed ends respectively.

In a possible embodiment of the present disclosure, the eye region of the helmet is provided with a pair of transparent goggles, and the convergent light exiting from the eyepiece lens group is transmitted to an inner surface of the goggles.

In a possible embodiment of the present disclosure, an inner surface of the helmet is provided with a transmission channel, the transmission channel extends in accordance with a curvature of the inner surface, and the light conduction optical fiber bundle is arranged in the transmission channel.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

In order to prevent the occurrence of a safety risk due to a limitation on a field of view during the cycling in the related art, the present disclosure provides in some embodiments a rear-view device, with a rear-view image guiding system on a helmet to collect images in regions that are not viewed directly, e.g., a side region and/or a rear region, so as to enable a wearer to view images in the regions other than a front-view region in real time during the cycling, thereby to prevent the occurrence of the safety risk due to the limitation on the field of view during the cycling.

Figure 1:
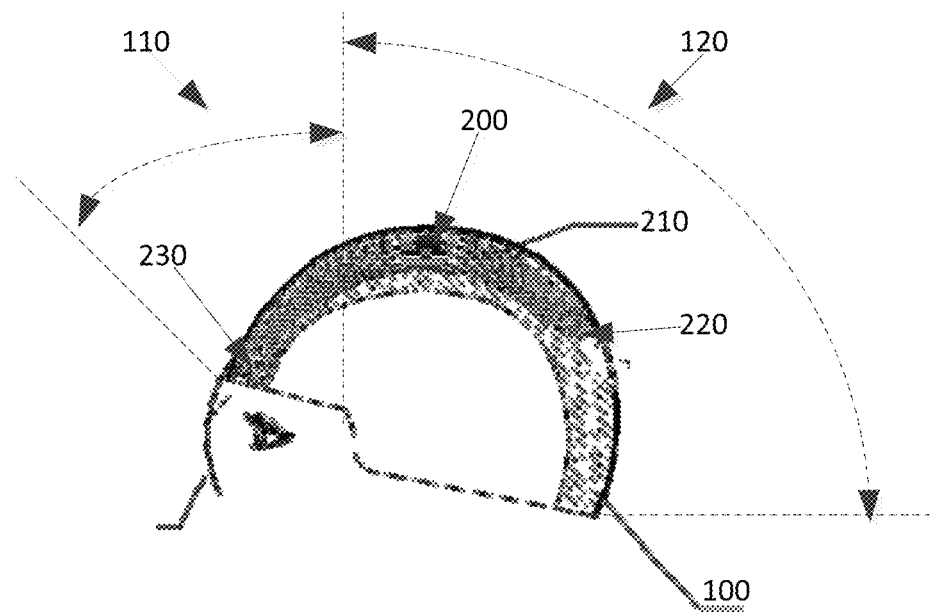
FIG. 1 is a schematic view showing a rear-view device according to one embodiment of the present disclosure.
Figure 7:
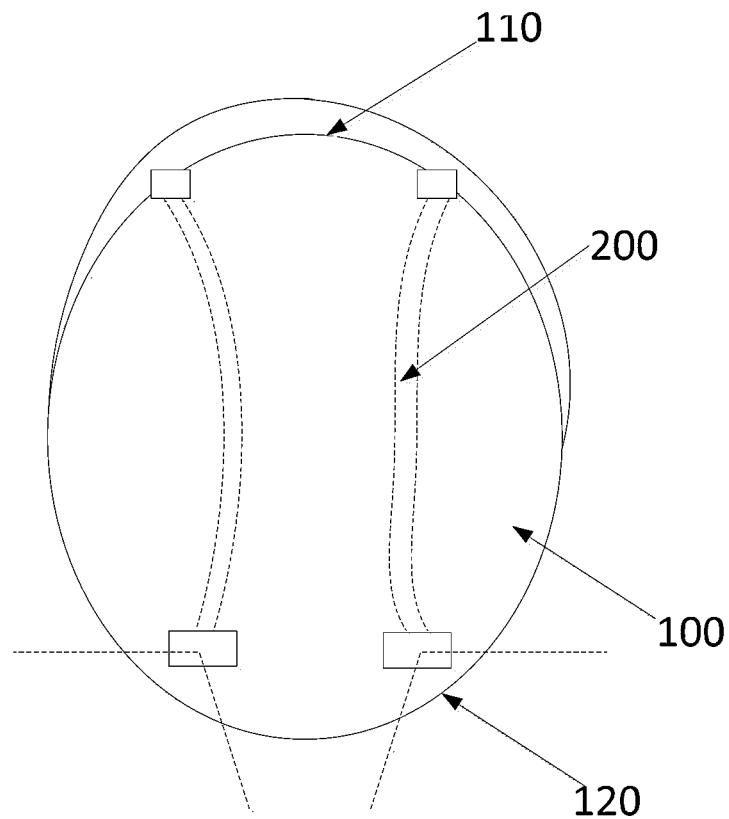
FIG. 7 is another schematic view showing the rear-view device according to one embodiment of the present disclosure.

As shown in FIG. 1 and FIG. 7, the present disclosure provides in some embodiments a rear-view device, including a helmet 100 and a rear-view image guiding system 200 arranged on the helmet 100. The rear-view image guiding system 200 includes a light conduction optical fiber bundle 210, and an objective lens group 220 and an eyepiece lens group 230 arranged at two ends of the light conduction optical fiber bundle 210 respectively. The helmet 100 includes a first cladding region 110 and a second cladding region 120, the first cladding region 110 is a region of the helmet 100 corresponding to a front face region of a wearer, and the second cladding region 120 is a region of the helmet 100 except the first cladding region 110. The objective lens group 220 is arranged in the second cladding region 120, light transmitted to at least a part of the second cladding region 120 reaches the objective lens group 220, and the objective lens group 220 is configured to convert received incident light into parallel light. The light conduction optical fiber bundle 210 is configured to transmit the parallel light to the eyepiece lens group 230. The eyepiece lens group 230 is configured to converge the parallel light and transmit convergent light to an eye region of the helmet 100.

In the embodiments of the present disclosure, as shown in FIG. 1, when the helmet 100 is worn by the wearer, a part of the helmet 100 covers a front face region of the wearer, and generally covers a forehead region of the wearer's face. In the embodiments of the present disclosure, this part is defined as the first cladding region 110, and a region of the helmet 100 other than the first cladding region 110 is defined as the second cladding region 120. As shown in FIG. 1, each position of the second cladding region 120 is oriented in a direction that is not directly viewed by the wearer of the helmet 100.

According to the rear-view device in the embodiments of the present disclosure, the rear-view image guiding system 200 is arranged on the helmet 100, and the objective lens group 220 of the rear-view image guiding system 200 receives the light transmitted to at least a part of the second cladding region 120. The light is converted into parallel light and then transmitted to the eyepiece lens group 230 through the light conduction optical fiber bundle 210. The eyepiece lens group 230 converges the parallel light and transmits the convergent light to the eye region of the helmet 100, i.e., transmits the convergent light to eyes of the wearer, so as to enable the wearer to view the images in the regions other than a front-view region in real time during the cycling, thereby to prevent the occurrence of a safety risk due to the limitation on the field of view during the cycling.

As shown in FIG. 1, the front face region of the helmet 100 is provided with an open space so as to expose the eyes. In the embodiments of the present disclosure, the eye region of the helmet 100 is also an eye region in the open space of the helmet 100. After the parallel light is converged by the eyepiece lens group 230, the convergent light is transmitted to the eye region 1, so that the wearer views the image formed by the images transmitted through the objective lens group 220 and the light conduction optical fiber bundle 210.

Figure 2:
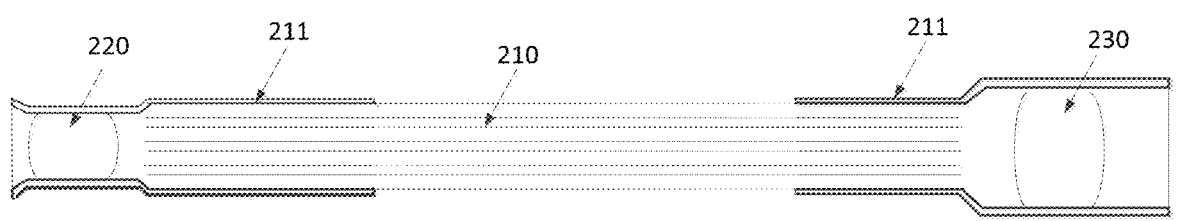
FIG. 2 is a sectional view of a rear-view image guiding system according to one embodiment of the present disclosure.

FIG. 2 is a sectional view of the rear-view image guiding system 200. As shown in FIG. 2, a flexible protection layer surrounds the light conduction optical fiber bundle 210, two ends of the flexible protection layer are coupled to fixed ends 211 respectively, and the two ends of the light conduction optical fiber bundle 210 are fixed inside the fixed ends 211 respectively.

When the flexible protection layer surrounds the light conduction optical fiber bundle 210, it is able to form the light conduction optical fiber bundle 210 on the helmet 100 in a bending manner. In addition, through the fixed ends 211, it is able to fix the two ends of the light conduction optical fiber bundle 210.

Figure 3:
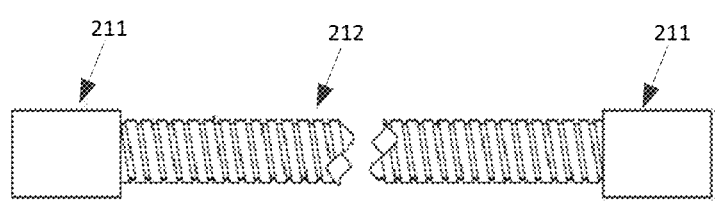
FIG. 3 is a schematic view showing an appearance of a light conduction optical fiber bundle according to one embodiment of the present disclosure.

FIG. 3 shows an external structure of the light conduction optical fiber bundle 210. The flexible protection layer is a metal hose 212 with a hollow structure, and two ends of the metal hose 212 are coupled to the fixed ends 211 respectively. In a possible embodiment of the present disclosure, the fixed end 211 is made of a metal material, e.g., a light aluminum material. The light conduction optical fiber bundle 210 includes a plurality of optical fibers penetrating through the metal hose 212, and each end of the light conduction optical fiber bundle 210 is fixed through a respective one of the fixed ends 211. In addition, each of the fixed ends 211 is provided with a via hole to form an optical transmission channel through which light enters and exits from the light conduction optical fiber bundle 210.

In the embodiments of the present disclosure, as shown in FIG. 2, the eyepiece lens group 230 and the objective lens group 220 are arranged at two ends of the light conduction optical fiber bundle 210 respectively. In a possible embodiment of the present disclosure, each of the fixed ends 211 is coupled to a lens cone. A first lens cone is arranged at a light-entering side of the light conduction optical fiber bundle 210 for the objective lens group 220, and a second lens cone is arranged at a light-exiting side of the light conduction optical fiber bundle 210 for the eyepiece lens group 230.

It should be appreciated that, the first lens cone for the objective lens group 220 or the second lens cone for the eyepiece lens group 230 is not limited to be fixedly coupled to the fixed end 211, and instead, it may be directly mounted on the helmet 100 and separated from the fixed end 211.

Figure 4:
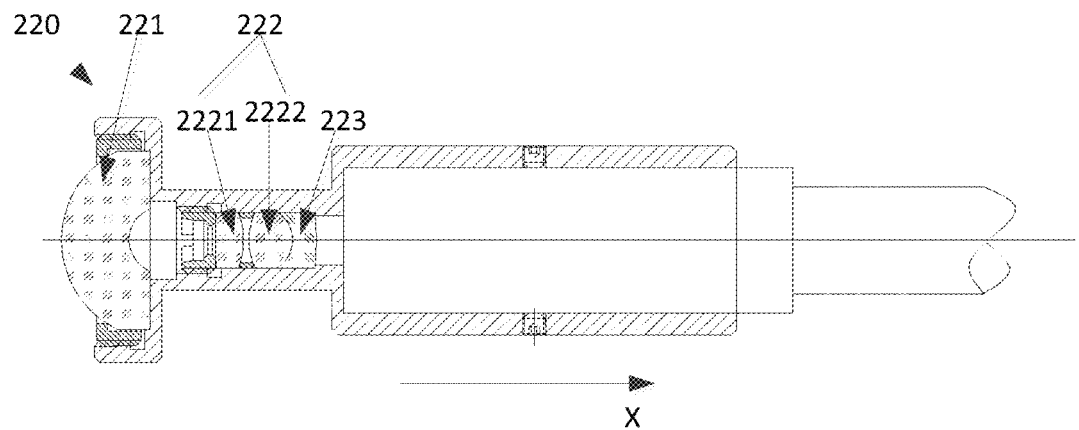
FIG. 4 is a sectional view of an objective lens group according to one embodiment of the present disclosure.

In the embodiments of the present disclosure, as shown in FIG. 4, the objective lens group 220 includes a first convex lens 221, a second convex lens 222 and a first concave lens 223 arranged in a transmission direction X of the incident light in sequence. A light-entering surface and a light-exiting surface of the first convex lens 221 are curved surfaces protruding towards a direction Y opposite to the transmission direction of the incident light, a light-entering surface of the first concave lens 223 is a curved surface depressed towards the transmission direction X of the incident light, and a light-exiting surface of the first concave lens 223 is a plane.

Through a convergence effect of the first convex lens 221 and the second convex lens 222 as well as a light diffusion effect of the first concave lens 223, it is able for the objective lens group 220 to convert the incident light into parallel light.

In a possible embodiment of the present disclosure, the second convex lens 222 may include a plurality of convex lenses. In the embodiments of the present disclosure, the second convex lens 222 includes two convex lenses. As shown in FIG. 4, the second convex lens 222 includes a first convex sub-lens 2221 and a second convex sub-lens 2222 arranged in the transmission direction X of the incident light in sequence, the first convex sub-lens 2221 and the second convex sub-lens 2222 are spaced apart from each other, and a light-exiting surface of the second convex sub-lens 2222 is attached to the light-entering surface of the first concave lens 223.

In the embodiments of the present disclosure, a refractive index of the first convex sub-lens 2221 is the same as a refractive index of the second convex sub-lens 2222.

In addition, in a possible embodiment of the present disclosure, both a refractive index of the first convex lens 221 and a refractive index of the first concave lens 223 are greater than the refractive index of the first convex sub-lens 2221 and the refractive index of the second convex sub-lens 2222. In the embodiments of the present disclosure, the refractive index of the first concave lens 223 is greater than or equal to the refractive index of the first convex lens 221.

Figure 5:
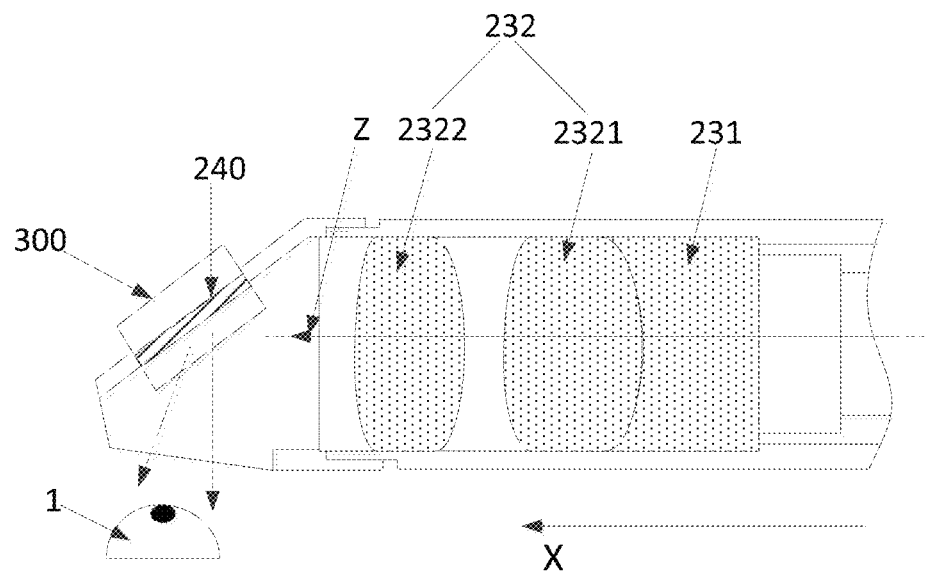
FIG. 5 is a sectional view of an eyepiece lens group according to one embodiment of the present disclosure.

In the embodiments of the present disclosure, as shown in FIG. 5, the eyepiece lens group 230 includes a second concave lens 231, a third convex lens 232 and at least one reflector 240 arranged in a transmission direction X of the parallel light in sequence, a light-entering surface of the second concave lens 231 is a plane, a light-exiting surface of the third convex lens 232 is a curved surface protruding towards the transmission direction X of the parallel light Z, and convergent light from the third convex lens 232 is reflected by the reflector 240 and then transmitted to the eye region of the helmet 100.

In a possible embodiment of the present disclosure, the third convex lens 232 may include a plurality of convex lenses. As shown in FIG. 5, the third convex lens 232 includes a third convex sub-lens 2321 and a fourth convex sub-lens 2322 arranged in the transmission direction X of the parallel light in sequence, the third convex sub-lens 2321 and the fourth convex sub-lens 2322 are spaced apart from each other, and a light-entering surface of the third convex sub-lens 2321 is attached to the second concave lens 231. A refractive index of the fourth convex sub-lens 2322 is greater than a refractive index of the third convex sub-lens 2321.

In the embodiments of the present disclosure, the reflector 240 is coupled to the helmet 100 through an angle adjustment structure 300. The angle adjustment structure 300 is coupled to the helmet 100 and the reflector 240, and configured to adjust an angle of the reflector 240 relative to the eye region. For example, the angle of the reflector 240 relative to the eye region is changed between a first inclination angle and a second inclination angle through the angle adjustment structure. At the first inclination angle, the convergent light from the fourth convex sub-lens 2322 is reflected by the reflector 240 at a central region toward an upper boundary of the eye region. At the second inclination angle, the convergent light from the fourth convex sub-lens 2322 is reflected by the reflector 240 at the central region towards a lower boundary of the eye region.

According to the embodiments of the present disclosure, the convergent light from the objective lens group 220 is adjusted in the eye region of the helmet 100, so it is able to transmit the convergent light into eyes of the wearer accurately, thereby to meet requirements on different users.

Figure 6:
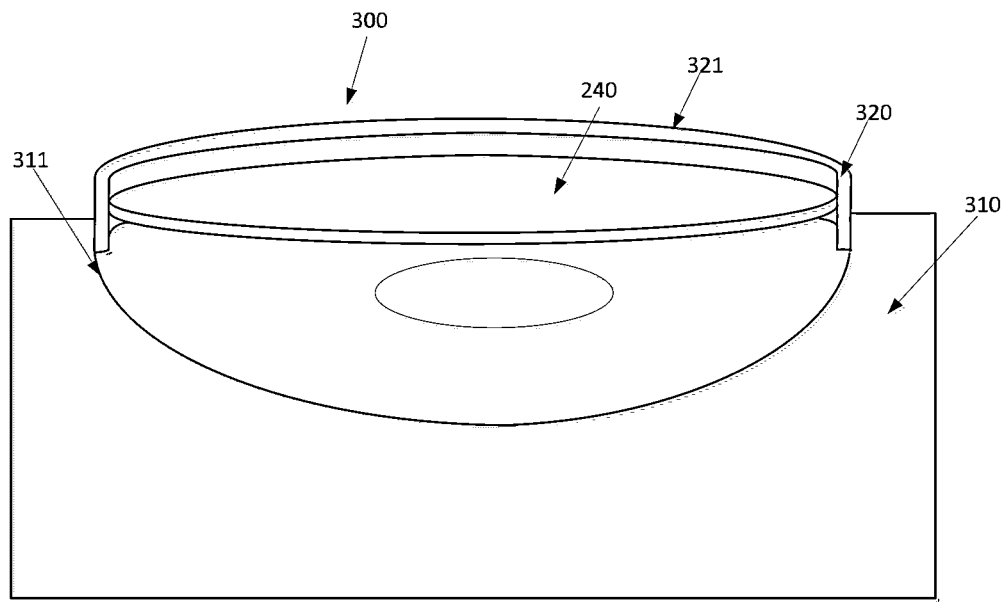
FIG. 6 is a schematic view showing an angle adjustment structure according to one embodiment of the present disclosure.

As shown in FIG. 6, in a possible embodiment of the present disclosure, the angle adjustment structure 300 includes: a first support structure 310 fixedly coupled to the helmet 100 and including an accommodation space, an inner bottom surface of the accommodation space being a first spherical surface 311; and a second support structure 320, the reflector 240 being fixed on the second support structure 320, the second support structure 320 including a second spherical surface 321 and being arranged in the accommodation space, the second spherical surface 321 being attached to the first spherical surface 311. The angle of the reflector 240 relative to the eye region is changed through the movement of the second spherical surface 321 relative to the first spherical surface 311.

In a possible embodiment of the present disclosure, the second support structure 320 is further coupled to the first support structure 310 through a rotatable shaft, and the second support structure 320 is arranged in the accommodation space of the first support structure 310. Through rotating the rotatable shaft, the second support structure 320 rotates relative to the first support structure 310, and the second spherical surface 321 moves along the first spherical surface 311. The second spherical surface 321 is attached to the first spherical surface 311 and moves relative to the first spherical surface 311, so as to adjust the angle of the reflector 240 accurately.

In a possible embodiment of the present disclosure, the angle adjustment structure 300 is directly fixed on the helmet 100, i.e., the first support structure 310 is fixedly coupled to the helmet 100. In another possible embodiment of the present disclosure, the entire eyepiece lens group 230 is mounted in the second lens cone, i.e., the reflector 240, the second concave lens 231, the third convex sub-lens 2321 and the fourth convex sub-lens 2322 are mounted in the second lens cone.

In a possible embodiment of the present disclosure, the quantity of the reflectors 240 is an odd number, the light conduction optical fiber bundle 210 includes a first portion and a second portion arranged in a length direction, the first portion is coupled to the second portion through a rotatable bending portion, and the second portion is turned by a predetermined angle relative to the first portion through the rotatable bending portion. In the embodiments of the present disclosure, the predetermined angle is 180°.

In order to avoid the occurrence of image inversion caused when the light is reflected and then transmitted to the eyes in the case that the quantity of the reflectors 240 is an odd number, the entire light conduction optical fiber bundle 210 includes the first portion and the second portion arranged in the length direction, and the second portion is turned by 180° relative to the first portion. In this way, the light in the optical conduction fiber bundle 210 is turned upside down, so as to prevent the occurrence of a reversed image.

In the embodiments of the present disclosure, in order to transmit the parallel light to the eyepiece lens group after the light has been converted by the objective lens group into the parallel light, the parallel light is transmitted in the light conduction optical fiber bundle in a total reflection manner.

In a possible embodiment of the present disclosure, the light conduction optical fiber bundle 210 includes a plurality of optical fibers, each optical fiber includes a core layer and a cladding layer surrounding the core layer, and a refractive index of the core layer is greater than a refractive index of the cladding layer.

According to the embodiments of the present disclosure, when the refractive index of the core layer is greater than the refractive index of the cladding layer, it is able to achieve the total reflection of the light in the optical fiber. In a possible embodiment of the present disclosure, the core layer is made of silicon dioxide ($SiO_2$) at a high purity level, and the cladding layer is made of $SiO_2$ doped with boron trioxide ($B_2O_3$). In a possible embodiment of the present disclosure, a diameter of the optical fiber is 14 μm to 18 μm, the refractive index n1 of the core layer is 1.67, and the refractive index n1 of the cladding layer 1.46.

In the embodiments of the present disclosure, as shown in FIG. 1, the eye region of the helmet 100 is provided with a pair of transparent goggles 130, and the convergent light from the eyepiece lens group 230 is transmitted to an inner surface of the goggles 130. In the embodiments of the present disclosure, the inner surface of the goggles 130 is used as a reflection surface to further reflect the convergent light to the eye region of the helmet 100, so as to enable the wearer to view the images.

In a possible embodiment of the present disclosure, an inner surface of the helmet 100 is provided with a transmission channel extending in accordance with a curvature of the inner surface, and the light conduction optical fiber bundle 210 is arranged in the transmission channel.

To be specific, the helmet 100 includes a rigid shell and a flexible layer arranged outside the rigid shell. In the embodiments of the present disclosure, the transmission channel is arranged in the flexible layer and extends in accordance with a curvature of the flexible layer, so as to improve the comfort and appearance of the helmet 100.

Figure 8:
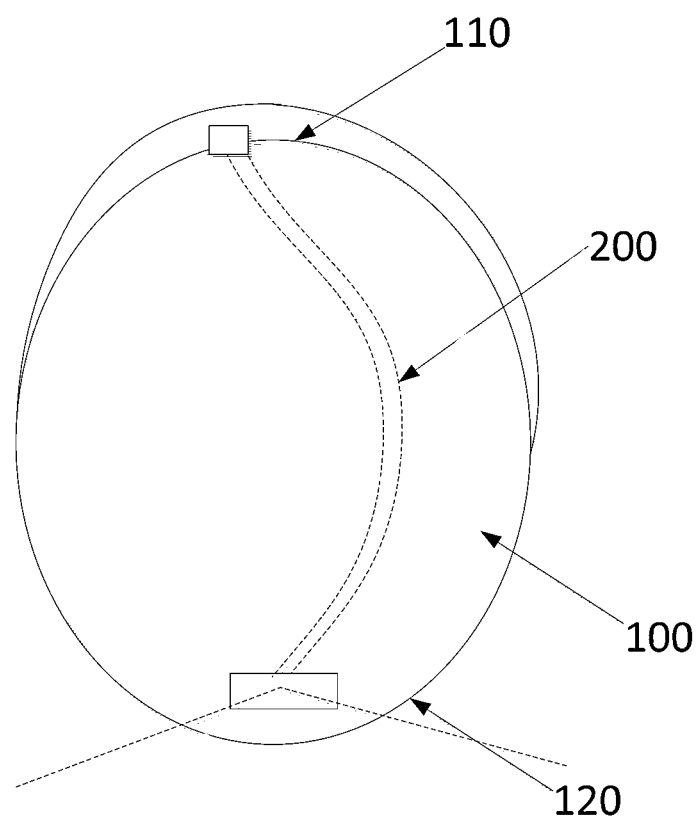
FIG. 8 is yet another schematic view showing the rear-view device according to one embodiment of the present disclosure.

In a possible embodiment of the present disclosure, as shown in FIG. 7, the rear-view image guiding systems 200 are arranged at a left side and a right side of the helmet 100 respectively, the light conduction optical fiber bundle 210 of each rear-view image guiding system 200 is arranged along one side of the helmet 100 and extends in accordance with a curvature of the helmet 100. It should be appreciated that, the rear-view image guiding systems 200 are not limited to be arranged on the helmet 100 as shown in FIG. 7. For example, as shown in FIG. 8, the quantity of the rear-view image guiding systems 200 is only one, and it is arranged in the flexible layer inside the helmet 100 in such a manner as to extend across a top of the helmet in accordance with the curvature of the helmet 100 from the first cladding region 110 to the second cladding region 120.

In a possible embodiment of the present disclosure, the objective lens group 220 is arranged at the top and faces the rear of the helmet 100, so as to obtain an optimum viewing angle.

In addition, in a possible embodiment of the present disclosure, an extension length of the light conduction optical fiber bundle 210 on the helmet 100 is greater than or equal to 270 mm, so as to enable the wearer to view a clear image after the light is transmitted in the light conduction optical fiber bundle 210.

According the rear-view device in the embodiments of the present disclosure, the rear-view image guiding system is arranged on the helmet, so it is able for the wearer to view the image in the regions other than the front-view region in real time during the cycling, thereby to prevent the occurrence of the safety risk due to the limitation on the field of view during the cycling.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A rear-view device, comprising a helmet and a rear-view image guiding system arranged on the helmet, wherein the rear-view image guiding system comprises a light conduction optical fiber bundle, and an objective lens group and an eyepiece lens group arranged at two ends of the light conduction optical fiber bundle respectively;

the helmet comprises a first cladding region and a second cladding region, the first cladding region is a region of the helmet corresponding to a front face region of a wearer, and the second cladding region is a region of the helmet except the first cladding region;

the objective lens group is arranged in the second cladding region, light transmitted to at least a part of the second cladding region reaches the objective lens group, and the objective lens group is configured to convert received incident light into parallel light;

the light conduction optical fiber bundle is configured to transmit the parallel light to the eyepiece lens group; and the eyepiece lens group is configured to converge the parallel light and transmit convergent light to an eye region of the helmet;

wherein the eyepiece lens group comprises a second concave lens, a third convex lens and at least one reflector arranged in a transmission direction of the parallel light in sequence, a light-entering surface of the second concave lens is a plane, a light-exiting surface of the third convex lens is a curved surface protruding towards the transmission direction of the parallel light, and convergent light exiting from the third convex lens is reflected by the reflector and then transmitted to the eye region of the helmet;

wherein the rear-view device further comprises an angle adjustment structure coupled to the helmet and the reflector and configured to adjust an angle of the reflector relative to the eye region;

wherein the angle adjustment structure comprises:

a first support structure fixedly coupled to the helmet and comprising an accommodation space, an inner bottom surface of the accommodation space being a first spherical surface; and a second support structure, the reflector being fixed on the second support structure, the second support structure comprising a second spherical surface and being arranged in the accommodation space, the second spherical surface being attached to the first spherical surface, and the angle of the reflector relative to the eye region being changed through the movement of the second spherical surface relative to the first spherical surface.

2. The rear-view device according to claim 1, wherein the objective lens group comprises a first convex lens, a second convex lens and a first concave lens arranged in a transmission direction of the incident light in sequence, wherein a light-entering surface and a light-exiting surface of the first convex lens are curved surfaces protruding towards a direction opposite to the transmission direction of the incident light, a light-entering surface of the first concave lens is a curved surface depressed towards the transmission direction of the incident light, and a light-exiting surface of the first concave lens is a plane.

3. The rear-view device according to claim 2, wherein the second convex lens comprises a first convex sub-lens and a second convex sub-lens arranged in the transmission direction of the incident light in sequence, the first convex sub-lens and the second convex sub-lens are spaced apart from each other, and a light-exiting surface of the second convex sub-lens is attached to the light-entering surface of the first concave lens.

4. The rear-view device according to claim 3, wherein a refractive index of the first convex sub-lens is the same as a refractive index of the second convex sub-lens.

5. The rear-view device according to claim 1, wherein an inner surface of the helmet is provided with a transmission channel, the transmission channel extends in accordance with a curvature of the inner surface, and the light conduction optical fiber bundle is arranged in the transmission channel.

6. The rear-view device according to claim 1, wherein the third convex lens comprises a third convex sub-lens and a fourth convex sub-lens arranged in the transmission direction of the parallel light in sequence, the third convex sub-lens and the fourth convex sub-lens are spaced apart from each other, and a light-entering surface of the third convex sub-lens is attached to the second concave lens; and a refractive index of the fourth convex sub-lens is greater than a refractive index of the third convex sub-lens.

7. The rear-view device according to claim 1, wherein the eye region of the helmet is provided with a pair of transparent goggles, and the convergent light exiting from the eyepiece lens group is transmitted to an inner surface of the goggles.

8. The rear-view device according to claim 1, wherein the quantity of the reflectors is an odd number, the light conduction optical fiber bundle comprises a first portion and a second portion in a length direction, the first portion is coupled to the second portion through a rotatable bending portion, and the second portion is turned by a predetermined angle relative to the first portion through the rotatable bending portion.

9. The rear-view device according to claim 1, wherein the light conduction optical fiber bundle comprises a plurality of optical fibers, each optical fiber comprises a core layer and a cladding layer surrounding the core layer, and a refractive index of the core layer is greater than a refractive index of the cladding layer.

10. The rear-view device according to claim 1, wherein the parallel light is transmitted in the light conduction optical fiber bundle in a total reflection manner.

11. The rear-view device according to claim 10, wherein the light conduction optical fiber bundle comprises a plurality of optical fibers, each optical fiber comprises a core layer and a cladding layer surrounding the core layer, and a refractive index of the core layer is greater than a refractive index of the cladding layer.

12. The rear-view device according to claim 1, wherein a flexible protection layer surrounds the light conduction optical fiber bundle, two ends of the flexible protection layer are coupled to fixed ends respectively, and the two ends of the light conduction optical fiber bundle are fixed inside the fixed ends respectively.

* * * * *